United States Patent

[11] 3,590,448

[72] Inventor Donald R. Bryant
 926 24th Ave. North, Texas City, Tex. 77590
[21] Appl. No. 787,661
[22] Filed Dec. 30, 1968
[45] Patented July 6, 1971

[54] CONSTRUCTION APPARATUS
 10 Claims, 12 Drawing Figs.
[52] U.S. Cl. .................................................. 25/118 R,
 25/1 R, 264/31
[51] Int. Cl. .................................................. B28b 7/04
[50] Field of Search .................................................. 25/1 B, 41
 J, 41.5, 118, 131, 131 Z, 124, 130 A, 131.5 A,
 131.5 B, 131.5 C, DIG. 26; 249/1, 13, 65, 188;
 52/80, 81; 264/31, 32, 33, 34, 35

[56] References Cited
 UNITED STATES PATENTS
 803,865 11/1905 Weller .......................... 25/41 (.5)
 2,296,984 9/1942 Corbetta ...................... 25/118 (M)
 2,979,798 4/1961 Price ............................ 264/32 X
 3,016,595 1/1962 Durst ............................ 25/131

Primary Examiner—J. Spencer Overholser
Assistant Examiner—Lucius R. Frye
Attorney—M. N. Cheairs ABSTRACT: An apparatus and method for the construction of circular structures of moldable materials. The apparatus comprises a first mold member having a shape and size substantially similar to one surface of said circular structure to be constructed, a second mold member spaced apart from said first mold member and substantially parallel to the surface thereof, the four edges of said second mold member intersecting at substantially right angles with one another, said second mold member having a horizontal length less than one-fourth the circumference of that portion of said first mold member adjacent said second mold member and having a vertical height less than one-fourth the vertical height of said first mold member as measured along the surface thereof, said second mold member being connected such as to permit vertical movement thereof to carrying means for horizontally moving said second mold member about the entire circumference of said first mold member while maintaining said second mold member at all times throughout such horizontal movement substantially equidistant from the surface of said first mold member.

PATENTED JUL 6 1971 3,590,448

INVENTOR.
DONALD R. BRYANT
BY
*M. M. Chain*
ATTORNEY

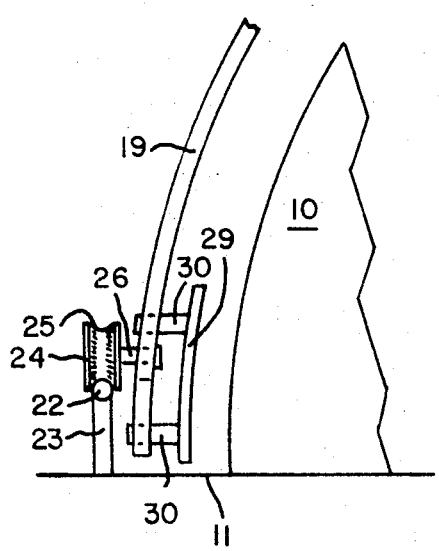
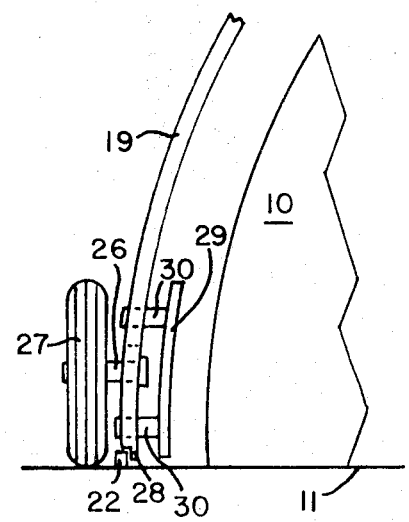
FIGURE 3
FIGURE 4
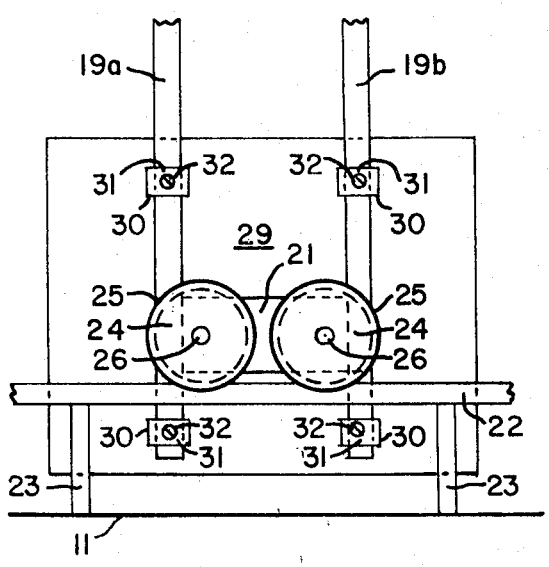
FIGURE 5
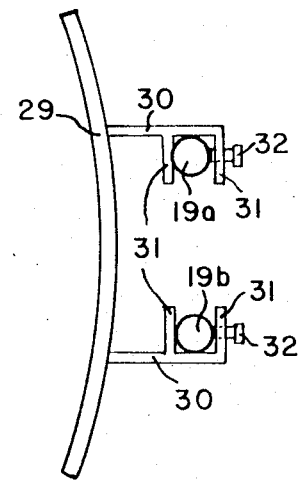
FIGURE 6

PATENTED JUL 6 1971 3,590,448

INVENTOR.
DONALD R. BRYANT
BY
ATTORNEY

CONSTRUCTION APPARATUS

BACKGROUND OF THE INVENTION

The present invention relates to the construction of circular structures. More particularly, the present invention relates to a method and apparatus for the construction of structures having a generally circular shape, either horizontally or horizontally and vertically.

The construction of circular buildings such as silos and dome-shaped buildings of concrete and other moldable materials represents a practical means of obtaining relatively inexpensive warehousing and other commercial structures as well as housing. Such structures have the additional advantage of being very strong. However, the building of circular buildings and particularly those that are dome-shaped, has presented problems with respect to means of construction. In general, the methods presently employed for such construction requires the use of extensive and complicated forming which is itself relatively time-consuming and expensive to construct, utilize and remove.

It is an object of the present invention to provide a new and novel method and apparatus for the construction of circular structures.

Another object of the present invention is to provide a new and novel method and apparatus for the construction of circular structures of moldable materials.

It is another object of the present invention to provide a new and novel method and apparatus for the construction of dome-shaped structures of moldable materials.

A remaining object of the present invention is to provide a new and novel method and apparatus for the construction of circular structures and particularly dome-shaped structures, of moldable materials which method and apparatus provide for fast and relatively inexpensive operation and assembly.

Yet another object of the present invention is to provide a new and novel method and apparatus particularly useful in the construction of dome-shaped buildings and inverted dome-shaped swimming pools which method and apparatus provides for fast, simple and relatively inexpensive construction.

Additional objects will become apparent from the following description of the invention herein disclosed.

SUMMARY OF THE INVENTION

The present invention, which fulfills these and other objects, is, in one of its embodiments, an apparatus for the construction of circular structures of moldable materials, said apparatus comprising a first mold member having a shape and size substantially similar to one surface of the circular structure to be constructed, a second mold member spaced apart from said first mold member and substantially parallel to the surface thereof, the four edges of said second mold member intersecting at substantially right angles with one another, said second mold member having a horizontal length less than one-fourth the circumference of that portion of said first mold member adjacent said second mold member and having a vertical height less than one-fourth the vertical height of said first mold member, said second mold member being connected such as to permit vertical movement thereof to carrying means for horizontally moving said second mold member about the entire circumference of said first mold member while maintaining said second mold member at all times throughout such horizontal movement substantially equidistant from the surface of said first mold member.

In another of its embodiments, the present invention is a method for the construction of circular structures of moldable materials, said method comprising (1) constructing a first or base mold member having a shape and size substantially similar to one surface of said circular structure to be constructed, (2) positioning a second mold member in spaced apart but parallel relation to said base mold member, said second mold member having a horizontal length less than one-fourth the circumference of said base mold member adjacent said second mold member and a vertical height less than one-fourth the vertical height of said base mold member measured along its surface and said second mold member being connected to a carrying means which provides for said second mold member to be rotated throughout the circumference of said base mold member at varying elevations along said base mold member (3) introducing a moldable material between said second mold member and the base mold member (4) allowing such moldable material to harden sufficiently to require no further containment, (5) rotating said second mold member about the circumference of said base mold member a distance approximately equal to but generally no more than its horizontal length, (6) repeating steps (3), (4) and (5) until said second mold member has completely traversed the circumference of said base mold member, (7) raising said second mold member a distance equal to but generally no greater than its vertical height, (8) repeating steps (3), (4), (5) and thereafter consecutively repeating steps (7), (3), (4), (5) and (6) until said moldable material has been extended completely over the outer surface of said base mold member, and thereafter removing said second mold member and said base mold member to thereby leave a formed circular structure of said moldable material.

By means of the apparatus and method disclosed and described herein, circular structures of moldable materials may be rapidly and relatively inexpensively constructed. The apparatus is relatively simple and quick to construct and operate and allows for less labor requirements, more uniform construction and less expense both in construction of the forms and in the actual construction of the structure of the moldable material.

DESCRIPTION OF THE DRAWINGS

FIG. 3 of the drawings is a side elevational view of a particular embodiment of certain details of the apparatus of the present invention illustrated in FIG. 1.

FIG. 4 of the drawings is a side elevational view of the details of the apparatus of the present invention illustrated in FIG. 3 but illustrating another embodiment of such details.

FIG. 5 of the drawings is an outside view of the details of the apparatus of the present invention shown in FIG. 3 and is substantially the same embodiment as is illustrated in FIG. 3.

FIG. 6 of the drawings is a top view of an embodiment of the second mold member of the apparatus of the present invention.

DESCRIPTION OF THE PREFERRED EMBODIMENTS OF THE PRESENT INVENTION

Figure 9:
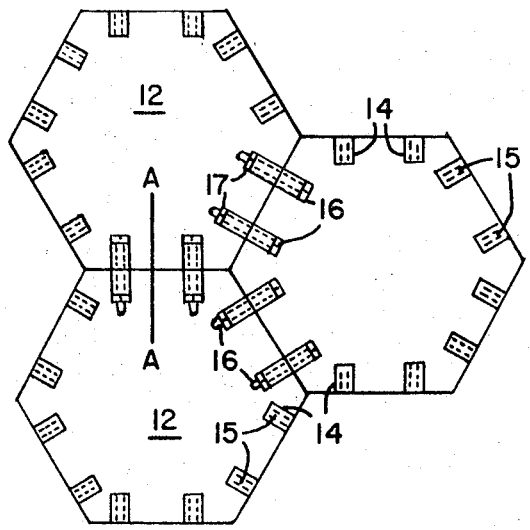
FIG. 9 of the drawings is a top view of several segments of the base mold member of the apparatus of the present invention illustrating a method of joinder thereof.
Figure 10:
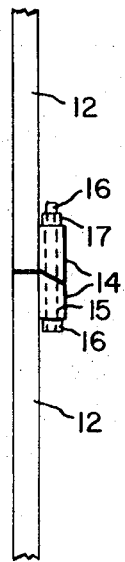
FIG. 10 of the drawings is a cross-sectional view through line A-A of FIG. 9.
Figure 11:
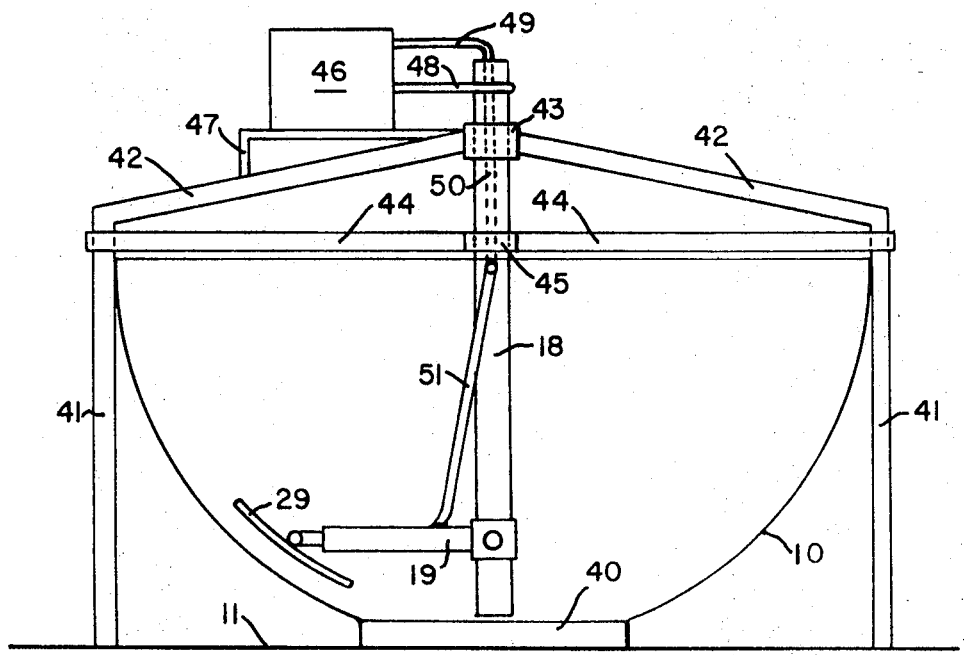
FIG. 11 of the drawings is a side elevational view of another embodiment of the apparatus of the present invention which embodiment is particularly useful in construction of swimming pools and other such open containers.
Figure 12:
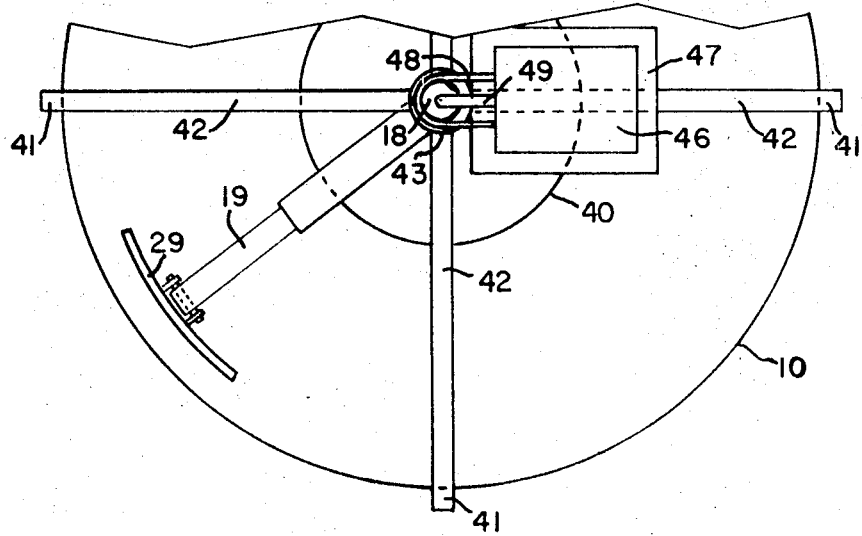
FIG. 12 of the drawings is a top view of the embodiment of the apparatus of the present invention shown in FIG. 11.

To describe the preferred embodiments of the present invention, reference is made to the accompanying drawings. FIGS. 1 through 5 primarily relate to an embodiment of the apparatus of the present invention wherein such apparatus is used for the construction of dome-shaped or hemispherical buildings. FIGS. 11 and 12 illustrate an embodiment of the apparatus of the present invention wherein such apparatus is utilized in the construction of elevated swimming pools. FIGS. 6 through 10 show details of the present invention which may apply to all embodiments thereof. In the drawings, the same characters are used throughout to denote like features of the apparatus of the present invention.

Figure 1:
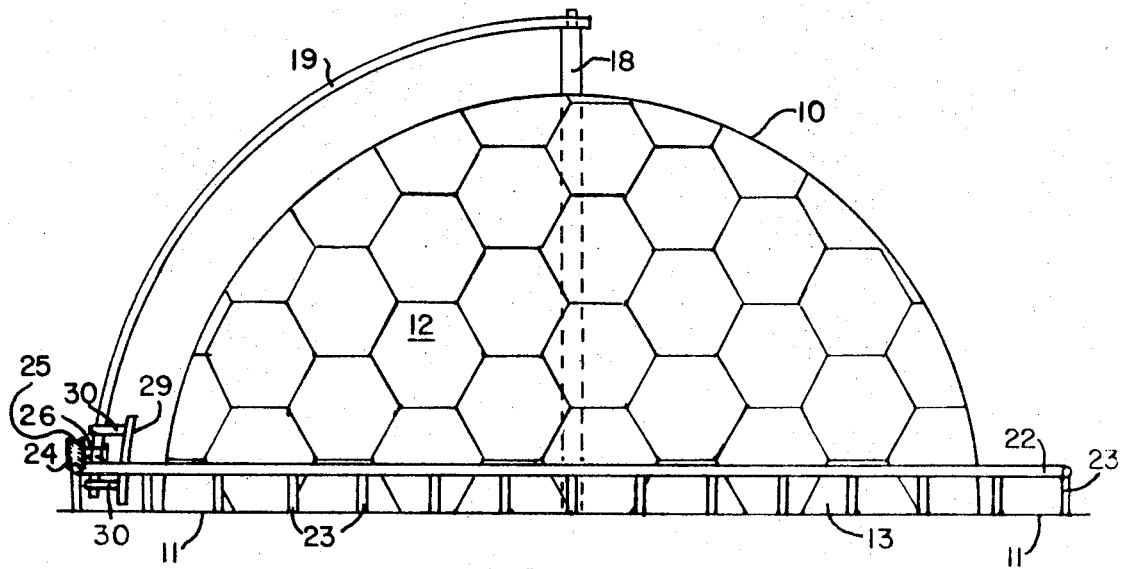
FIG. 1 of the drawings is a side elevational view of an embodiment of the apparatus of the present invention useful in construction of dome-shaped buildings.
Figure 2:
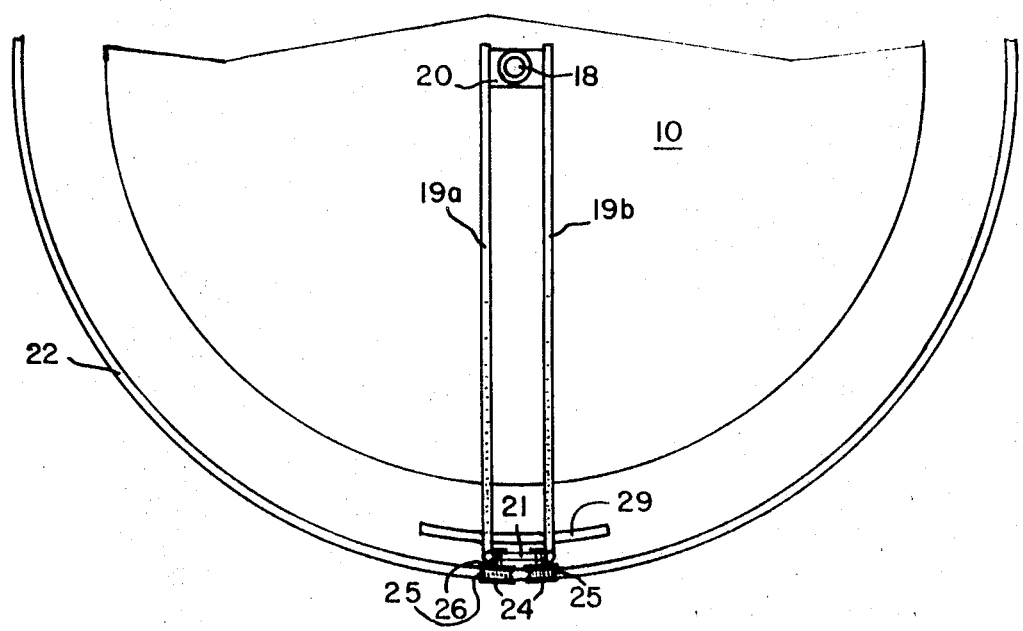
FIG. 2 of the drawings is a top view of an embodiment of the apparatus of the present invention similar to that illustrated in FIG. 1.
Figure 7:
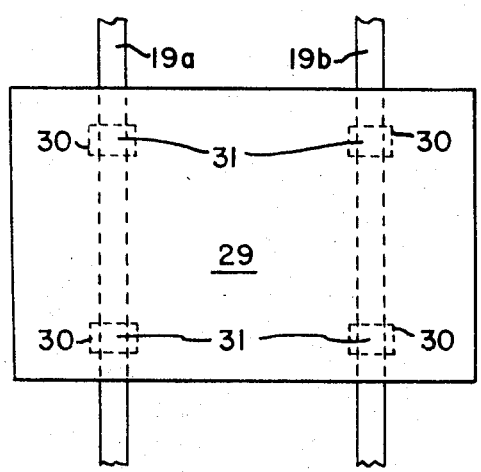
FIG. 7 of the drawings is an inside view of the embodiment of the second mold member detail of the apparatus of the present invention shown in FIG. 6.
Figure 8:
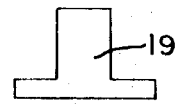
FIG. 8 of the drawings is a top cross-sectional view of an embodiment of the carrying arm detail of the apparatus of the present invention.

Referring to the drawings, particularly FIGS. 1 and 2, first mold member or base mold 10 is shown in dome-shaped configuration with its circular base resting upon a surface 11 which may be earth concrete, asphalt or other material suitable as a base for the construction of buildings. The term "-dome-shaped" as used herein is meant to include structures having elliptical surfaces as well as spherical surfaces. Also, this term includes structures which have a portion thereof cylindrical in shape with one end of said cylindrical structure being closed or partially closed with structure having spherical or elliptical surfaces. In any event, base mold 10 is substantially circular in configuration in any horizontal plane through base mold 10 which is perpendicular to the axis of said base mold.

Base mold 10 preferably is made up of a plurality of attachable-detachable segments 12 which, generally, are of metal. The use of such segments 12 greatly enhances the portability and handling of the apparatus of the present invention. Segments 12 may be of a number of shapes and sizes depending upon the selection of the user and the shape of the structure being constructed. FIG. 1 illustrates segments 12 in hexagonal configuration with the exception of certain alternate base segments 13 which represent a segment 12 cut in half. As well as hexagonal, segments 12 may be pentagonal, triangular, or the like or combinations of these. A particularly useful means of dividing the dome-shaped base mold 10 into segments 12 is one based upon U.S. Pat. No. 2,682,235 which discloses the use of structural elements interconnected in a geodesic pattern to form a threeway grid defining substantially equilateral triangles. Generally, the outer surface of segments 12 is curved such that the joining together of all segments provides a continuous curved surface over the entire surface of base mold 10. However, it is not an absolute requirement that such surface be curved but rather, it may be substantially flat providing that the individual segments are sufficiently small that complete assemblage thereof results in a generally rounded appearance.

The manner of attaching segments 12 to one another may be any means which provide for tight joinder of the edges of the segments being attached and yet which will provide for relatively simple and fast attachment and detachment of such segments to and from one another. Referring to FIGS. 9 and 10, a useful but non limiting method of joining segments 12 is illustrated. Each of segments 12 which are illustrated as hexagonal in shape, has two joining sleeves 14 adjacent each edge and extending from and below the under surface thereof, each of said joining sleeves 14 having openings 15 therethrough for passage of bolts 16. The two joining sleeves 14 of each edge of segments 12 are positioned such that when the edges of adjacent segments 12 are aligned, an opening 15 of each of joining sleeves 14 of the edge of one of said segments 12 is in alignment with an opening 15 in one of the joining sleeves 14 of the joining edge of the adjacent segment 12. Bolts 16 may then be passed through the aligned openings 15 of such adjacent joining sleeves 14 and nut 17 tightened thereon. The tightening of nut 17 will thereby fasten the adjacent segments 12 together. This means of fastening segments 12 is particularly useful in that it allows ready access to bolt 16 and nut 17 from the same side of segment 12. While this described method is, as indicated, a useful method, the present invention is not limited to any such method since many other similar methods, as well as variations of this method, exist and may be practiced as well.

The bracing desirable for supporting base mold 10 and the moldable material which will be molded thereupon will vary substantially depending upon the embodiment of the present invention being practiced, the exact shape of the structure being constructed, the particular moldable material to be applied, the thickness of such application, the design of the segments of the base mold and the method of joinder of such segments and like considerations. In many instances, little or no bracing is required. The determination of whether to use any such bracing and how much is well within the ability of those skilled in the art and requires no further discussion here since it forms no part of the present invention except as hereinbelow discussed with respect to pivot member 18.

Referring particularly to FIGS. 1 and 2, a pivot member 18 extends upward along the axis of base mold 10. While pivot member 18 may be a short bar extending from the uppermost part of base mold 10, more often it is in the form of a vertical metal pole extending from surface 11 upward along the axis of base mold 10 through the uppermost point in said base mold. The use of such a vertical metal pole as pivot 18 serves the secondary purpose of bracing base mold 10.

Rotatably connected to the upper end of pivot member 18 is carrying arm 19. In FIGS. 2, 5 and 6, carrying arm 19 is shown as comprising two separate but same round carrying arm members 19a and 19b which are joined by an upper bracket 20 and a lower bracket 21. Instead of rounded, arm members 19a and 19b may have the T-shape shown in FIG. 8 or other similarly functional shape. Additionally, carrying arm 19 may be only a single member rather than two as illustrated, in which case, it is somewhat preferred that carrying arm 19 have a cross-sectional shape similar to that shown in FIG. 8.

Carrying arm 19 curves outward and downward from its rotatable attachment to pivot member 18 to a point just above but out of contact with surface 11. The curvature of carrying arm 19 generally is such that it lies at all points along its length substantially equidistant from base mold 10.

Adjacent its lower end, carrying arm 19 is in moveable contact with guide means 22. This guide means 22 functions to provide means for guiding the lower end of carrying arm 19 about the circumference of the base of base mold 10 while maintaining said lower end of carrying arm 19 at all times substantially equidistant from the base of said base mold 10. Guide means 22 may be a raised circle of tubular metal, as shown in FIGS. 1, 2 and 3, supported by a plurality of spaced apart guide supports 23 extending from surface 11 to support guide means 22 above such surface and in coaxial alignment with the base mold 10. In another embodiment, as shown in FIG. 4 and as is more fully described hereinbelow, guide means 22 is a circular vertically extending rail lying upon surface 11 and fixed in relation thereto in coaxial alignment with base mold 10.

The means whereby carrying arm 19 traverses the base of base mold 10 in moveable contact with guide means 22 is illustrated in two different embodiments in FIGS. 3, 4 and 5. Referring first to FIGS. 3 and 5, carrying arm 19 is shown in moveable contact with guide means 22 through wheels 24. If needed or desired, three or more such wheels may be employed or, in other instances, only one may be used. The number of wheels employed will depend largely on the weights being supported thereby, the horizontal width of carrying arm 19 and the other similar such considerations which are well within the ability of those skilled in the art to evaluate and determine in view of the teachings herein. Wheels 24 have grooved peripheries 25 adapted for receiving and rolling upon the upper portion of the surface of guide means 22. Axles 26 extend through lower bracket 21 of carrying arm 19. In this embodiment, carrying arm 19 traverses upon and also is guided by guide means 22.

FIG. 4 illustrates an embodiment wherein carrying arm 19 is guided in movement about the base of base mold 10 by means of guide means 22 but traverses such path on rubber tired wheels 27 which move upon surface 11. In this embodiment, wheels 27 are connected to carrying arm 19 as described above, by means of axle 26 extending through lower bracket 21. With this embodiment, guide means 22 rests on surface 11 and is fixedly positioned thereto by any conventional means. Moveable contact with guide means 22 is made possible by lug 28 extending downward from the lower end of carrying arm 19, lug 28 being positioned for movement along the interior surface of guide means 22. If desired, lug 28 may be an inverted U-shaped for engagement on both sides of guide means 22. While this embodiment has been described with respect to a single wheel, two or more may be employed if needed or desired.

To carrying arm 19 is moveably connected second mold member 29 which substantially corresponds in the configuration of its internal surface to the external surface of base mold 10. In such manner, proper alignment of second mold member 29 will result in all points of its surface adjacent base mold 10 being substantially equidistant from the surface of base mold 10. The overall shape of second mold member 29 generally is rectangular and substantially flat with at least the inner surface thereof being curved to correspond to the curvature of the base mold 10. The size of the second mold member 29 may vary in accordance with the desires of the operator within the limits imposed by the moldable materials of construction, the size and shape of base mold 10, the size of carrying arm 19, and other similar considerations. Generally, however, the horizontal length of the second mold member 29 at its midpoint is less than one-fourth the circumference of base mold 10 in the horizontal plane in which such midpoint lies. Preferably, this length is less than one-tenth of such circumference. The height of second mold member 29 at its midpoint, generally, is less than one-fourth, preferably less than one-tenth, the arcuate height of base mold 10 adjacent such midpoint. With very light weight, readily moldable construction materials, the second mold member 29 may be readily employed in sizes to present larger surface areas while as the weight and handling difficulty of the moldable construction material increases, sizes of smaller surface area of outer mold segments are most often employed.

The moveable connection of second mold member 29 to carrying arm 19 is provided by means of mounting brackets 30 having clamping members 31 which are adapted to lie on opposite sides of each of carrying arm members 19a and 19b. With the embodiment of the present invention employing a carrying arm 19 comprised of two members, mounting brackets 30 are generally positioned such as to extend along the outer surfaces of such arm members as opposed to extending therebetween. Clamping members 31 are spaced such as to allow for movement of carrying arm members 19a and 19b therebetween. Securing of second mold member 29 in fixed position is by tightening setting bolts 32 against carrying arm members 19a and 19b thereby bringing inner clamping member 31 into tight contact with such carrying arm members. Loosening of setting bolts 32 will then allow mounting brackets 30 and thus, second mold member 29 to slide along carrying arms 19a and 19b. Those skilled in the art will readily recognize other means and modifications to provide for the movement of second mold member 29 up and down along carrying arm 19 but insofar as such means and modifications provide for such movement, they are within the spirit and scope of the present invention.

The construction of buildings in accordance with the present invention in utilizing the embodiments hereinabove described with reference to FIGS. 1 through 10, involves as the first step the construction of base mold 10 by connecting together segments 12 in a manner such as that described above. Base mold 10 is constructed on surface 11 which is of earth, concrete, asphalt or other suitable foundation material. Any reinforcing materials such as wire, metal rods, and the like which it is desired or deemed necessary to utilize is then fixed adjacent the surface of base mold 10 facing said second mold member 29 such as to lie therebetween.

At the uppermost point of base mold 10 is positioned a pivot member 18. About the base of base mold 10, guide means 22 is secured. Carrying arm 19 is then rotatably connected to pivot member 18 at its upper end and then placed in moveable contact with guide means 22 adjacent its lower end. Concurrently with or just before or just afterward, as the case may be depending upon the embodiment of the present invention utilized, wheels are secured adjacent the lower end of carrying arm 19 and placed in contact with guide means 22 or surface 11, again, depending upon the particular embodiment employed. Outer mold segment 29 is then fixedly attached to carrying arm 19 by tightening setting bolts 32, the lower edge of second mold member 29 being almost but not in contact with surface 11. Second mold member 29 is so positioned that its internal surface is substantially parallel with the adjacent surface of base mold 10.

A moldable construction material which is semihard but still moldable, is introduced into the area between second mold member 29 and base mold 10. As soon as this space is substantially filled even with the top edge of second mold member 29, carrying arm 19 is rotated such as to move second mold member 29 a distance approximate to but not greater than its horizontal length. Additional moldable material is introduced into the space between second mold member 29 and base mold 10 and the carrying arm 19 again rotated to move second mold member 29 the same distance. This procedure is then repeated until second mold member 29 has been completely around base mold 10. In this manner, the base layer of the moldable material is now formed.

Second mold member 29 is then moved upward on carrying arm 19 by loosening setting bolts 32 to thereby permit brackets 30 to be slid upward along arm members 19a and 19b. The distance upward which second mold member 29 is moved is approximately equal but no greater than its arcuate height. Second mold member 29 is then secured in the new position by tightening setting bolts 32. The moldable construction material is then again introduced into the space between second mold member 29 and base mold 10 until it is approximately to the upper edge of such second mold member 29. The second mold member 29 is then rotated to a new position and the steps of introducing the moldable material, rotation, etc. is repeated throughout the circumference of base mold 10 at that elevation. The second mold member 29 is again raised the same distance and the steps repeated until the moldable material has been extended over the entire surface of the base mold.

The moldable material is allowed to harden to rigidity and then carrying arm 19, base mold 10 and all other parts of the apparatus of the present invention removed. Any bracing of the completed structure deemed necessary or desirable may be left, if already in place, or placed in place within the structure.

Referring particularly to FIGS. 11 and 12 wherein another embodiment of the apparatus is shown, base mold 10 is shown in an inverted position from that illustrated in FIGS. 1 through 5. In other words, the circular base is turned upward and open to the atmosphere. This embodiment is particularly useful in the construction of swimming pools and other open-type containers. In this embodiment, as illustrated, base mold 10 is open at its lower end to a cylindrical base mold 40 and is supported by four equidistantly spaced legs 41. If desired, a greater or lesser number of legs 41 may be employed depending upon the vertical height of base mold 10 (along its axis), the materials of which the structure is to be constructed, the materials of which base mold 10 is constructed, and like considerations.

Base mold 10 is made up of segments 12 (not shown) as described above. Of course, joining sleeves 14 would be on the outer curvature of base mold 10 in this embodiment as opposed to being on the inner curvature in the embodiment of FIGS. 1 through 5.

Supporting beams 42 extend from legs 41 in angular relationship of greater than 90° to legs 41 to be joined with hub 43 which is concentric with the circular base of base mold 10. Rotatably connected with hub 43 is pivot member 18 which extends downward from hub 43 to a point adjacent the upper end of cylindrical base mold 40. Also, pivot member 18 extends a short distance above hub 43 for purposes more fully discussed below. In FIGS. 11 and 12, pivot member 18 is adapted for rotation whereas in FIGS. 1 and 2 it is not. It is within the scope of the present invention that it be rotatable or fixed without regard to the embodiment of the present invention employed.

Bracing members 44 extend from each of legs 41 substantially perpendicular to such legs 41 to a common sleeve 45 through which pivot member 18 extends and may rotate within. As a result of bracing members 44, pivot member 18 is prevented from departing from vertical alignment.

Carrying arm 19 extends from pivot member 18 in substantially perpendicular relation. In the embodiment illustrated, carrying arm 19 is connected to pivot member 18 in nonrotating attachment since the pivot member is rotatable. However, carrying arm 19 is connected in a manner to permit vertical movement along pivot member 18. FIGS. 11 and 12 illustrate carrying arm 19 as a hydraulically extendable substantially straight cylindrical arm. Rotatably connected to the outer end of carrying arm 19 is second mold member 29 having a shape and configuration as described above.

To facilitate rotation of pivot member 18 and the hydraulic extension of carrying arm 19, conventional means for imparting mechanical and hydraulic motion, i.e., electric or gasoline motor and pump, are provided as represented by housing 46 resting upon a support bracket 47 which rests upon one of the support beams 42. A belt 48 is shown in contact with pivot member 18 and housing 46 as a means of imparting rotational motion to pivot member 18. In the alternative, a system of gears could as well be used. A hydraulic line 49 is shown extending from housing 46 to joinder with passageway 50 through the center of pivot member 18 which passageway 50 is in open communication with the hydraulic chamber (not shown) of carrying arm 18 by means of a second hydraulic hose 51. In this manner, hydraulic pressure may be exerted to extend carrying arm 18. The operation of the rotating and extending means may be from a platform above base mold 10 or from surface 11 or other place as may be desired.

The method whereby the embodiment of the present invention illustrated in FIGS. 11 and 12 is utilized is substantially the same as that described above, the major differences being the provision for a substantially flat bottom area and the fact that construction takes place within base mold 10 as opposed to taking place exterior of base mold 10 in the embodiment of FIGS. 1 through 5.

In another embodiment, the construction apparatus and method may be applied to the construction of cylindrical structures such as silos. In such embodiments, base mold 10 is substantially cylindrical and may be used as the interior mold as illustrated in FIGS. 1 through 5 or as an exterior mold as illustrated in FIGS. 11 and 12.

Among the moldable materials useful in the present construction method are various concretes, generally in semidry form, plastics and certain asphalts and combinations of these. The texture of the moldable material should be such as to provide a substantially free standing but moldable material. If the material is too fluid, it will not be readily contained within the confines of second mold member 29 and base mold 10. If it is desired to use such fluid materials, however, the apparatus of the present invention may be readily adapted for such use. Such adaptation generally takes the form of adding detachable end plates to second mold member 29 which detachable plates extend from the end edges of second mold member 29 to adjacent the surface of base mold 10 thereby providing an ended container for the fluid materials. Upon the first section of such fluid material at each level becoming sufficiently hard to be freestanding, one of the end plates is removed and the second mold member 29 moved in the direction opposite to the end removed to the new position in the manner described above. In this manner, structures of the more fluid materials such as relatively fluid cement mixtures, etc., may be employed in the present construction method.

Openings such as window, door or piping openings may be provided in constructing structures in accordance with the apparatus and method of the present invention by attaching plates in substantially perpendicular alignment to base mold 10 and connected thereto, in the shape desired for the opening. These plates extend a distance from base mold 10 just less than the distance between second mold member 29 and base mold 10. In this manner, second mold member 29 may be moved over such plates without being obstructed and yet moldable material introduced into the space between second mold member 29 and base mold 10 will not pass into the area inclosed by such plates.

What I claim is:

1. An apparatus for the construction of circular structures of moldable materials, said apparatus comprising a first mold member having a shape and side substantially similar to one surface of said circular structure to be constructed, a second mold member spaced apart from and outside of said first mold member and substantially parallel to the surface thereof, the four edges of said second mold member intersecting at substantially right angles with one another, said second mold member having a horizontal length less than one-fourth the circumference of that portion of said first mold member adjacent said second mold member and having a vertical height less than one-fourth the vertical height of said first mold member as measured along the surface thereof, said second mold member being connected to a carrying means for horizontally moving said second mold member about the entire circumference of said first mold member while maintaining said second mold member at all times throughout such horizontal movement substantially equidistant from the surface of said first mold member, said connection of said second mold member to said carrying means being such as to permit vertical movement of said second mold member along the vertical surface of said carrying means.

2. The apparatus of claim 1 wherein said first mold member comprises a plurality of attachable-detachable segments connected together, said segments being of similar geometric configuration.

3. The apparatus of claim 1 wherein said carrying means comprises a carrying arm connected to a pivot member which lies along the axis of said first mold member.

4. The apparatus of claim 1 wherein said first mold member is dome-shaped.

5. The apparatus of claim 1 wherein said first mold member is cylindrical.

6. The apparatus of claim 4 wherein said carrying means comprises an arcuate carrying arm external of said first mold member and rotatably connected at its upper end to said pivot member and having means adjacent its lower end for traversing the base of said first mold member, said arcuate carrying arm lying substantially equidistant from said first mold member along substantially its entire length.

7. The apparatus of claim 6 wherein said carrying arm is in moveable contact with a circular guide means adjacent the base of said first mold member and equidistantly spaced therefrom throughout its circumference.

8. The apparatus of claim 7 wherein said guide means comprises a raised circle of tubular metal spaced apart from the surface and wherein said means adjacent the lower end of said arcuate carrying arm for traversing the base of said base mold comprises wheels having grooved peripheries for receiving and moving upon such guide means.

9. The apparatus of claim 7 wherein said guide means comprises a circular rail secured to the surface for construction and said means adjacent the lower end of said carrying arm for traversing the base of said base mold comprises a wheel and contact with said surface and wherein said carrying arm is in contact with said rail by means of a lug extending downward from said carrying arm into slidable contact with the inner surface of said rail.

10. The apparatus of claim 4 wherein said first mold member is inverted such that its circular base is uppermost and lies in a plane substantially parallel with the surface of the earth and said carrying arm comprising an extendable carrying arm extending from and substantially perpendicular to a pivot member which extends from a supported position above said first base mold along the axis thereof to a point just above the lower most surface of such base mold, said extendable carrying arm is connected to said pivot member for vertical movement along said pivot member.